United States Patent
Sugimoto (10) Patent No.: US 9,507,343 B2
(45) Date of Patent: Nov. 29, 2016

(54) NAVIGATION DEVICE AND METHOD OF NOTIFYING SERVICE LIFE OF COMPONENT

(71) Applicant: FURUNO ELECTRIC CO., LTD., Nishinomiya (JP)

(72) Inventor: Masashi Sugimoto, Nishinomiya Hyogo (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 0 days.

(21) Appl. No.: 14/896,279

(22) PCT Filed: May 13, 2014

(86) PCT No.: PCT/JP2014/062661
§ 371 (c)(1),
(2) Date: Dec. 4, 2015

(87) PCT Pub. No.: WO2014/196315
PCT Pub. Date: Dec. 11, 2014

(65) Prior Publication Data
US 2016/0132051 A1    May 12, 2016

(30) Foreign Application Priority Data
Jun. 5, 2013   (JP) .................................. 2013-118820

(51) Int. Cl.
*G05B 23/02*   (2006.01)
*B63J 99/00*   (2009.01)
(Continued)

(52) U.S. Cl.
CPC ........... *G05B 23/0283* (2013.01); *B63B 49/00* (2013.01); *B63J 99/00* (2013.01); *G01C 21/203* (2013.01); *B63J 2099/006* (2013.01)

(58) Field of Classification Search
CPC  G01C 21/203; G05B 53/0283; B63B 49/00; H04L 41/082
USPC ........................................................ 701/31.9
See application file for complete search history.

(56) References Cited

U.S. PATENT DOCUMENTS 6,859,831 B1 *  2/2005  Gelvin ............... B60R 25/1004
                                                    340/539.19
7,020,701 B1 *  3/2006  Gelvin .................. G01D 21/00
                                                          250/332
(Continued)

FOREIGN PATENT DOCUMENTS

JP   H11-110259 A   4/1999
JP   2002-183341 A  6/2002
(Continued)

OTHER PUBLICATIONS

International Search Report dated Aug. 12, 2014 in corresponding PCT Application No. PCT/JP2014/062661, 5 pgs.

*Primary Examiner* — McDieunel Marc
(74) *Attorney, Agent, or Firm* — Knobbe, Martens, Olson & Bear, LLP (57) ABSTRACT

A component service life notifying device configured to notify, beforehand, a service life of a component is provided to prevent the service life of the component from terminating on the sea. The navigation device (component service life notifying device) includes a route setting module, a navigation time calculating module, a service life acquiring module, and a notifying module. The route setting module sets a route for navigation. The navigation time calculating module calculates a scheduled navigation time period of the route. The service life acquiring module acquires an estimated service life of the component. A comparing module outputs a comparison result between the scheduled navigation time period to a predetermined destination of the route set by the route setting module and the estimated remaining service life. The notifying module notifies a situation that the comparison result outputted from the comparing module indicates that the estimated remaining service life is shorter than the scheduled navigation time period when the situation occurs.

14 Claims, 9 Drawing Sheets

(51) Int. Cl.
   *B63B 49/00*       (2006.01)
   *G01C 21/20*       (2006.01)

(56) References Cited

U.S. PATENT DOCUMENTS

| | | | | |
|---|---|---|---|---|
| 8,019,622 | B2 * | 9/2011 | Kaboff | G06Q 10/00 |
| | | | | 342/357.25 |
| 8,032,254 | B2 * | 10/2011 | Amundson | F24F 11/0086 |
| | | | | 165/238 |
| 8,087,593 | B2 * | 1/2012 | Leen | F24F 11/0086 |
| | | | | 236/49.3 |
| 8,582,383 | B2 * | 11/2013 | Takahashi | G11C 11/406 |
| | | | | 365/149 |
| 2008/0147257 | A1 | 6/2008 | Kuhlgatz et al. | |
| 2009/0187780 | A1 * | 7/2009 | Keohane | G06F 1/3203 |
| | | | | 713/324 |
| 2011/0191824 | A1 * | 8/2011 | Kim | G01C 21/3691 |
| | | | | 726/3 |
| 2016/0036667 | A1 * | 2/2016 | Kripalani | H04L 41/082 |
| | | | | 709/224 |
| 2016/0147223 | A1 * | 5/2016 | Edwards | G05D 1/0027 |
| | | | | 701/2 |

FOREIGN PATENT DOCUMENTS

| | | |
|---|---|---|
| JP | 2002-221076 A | 8/2002 |
| JP | 2002-234483 A | 8/2002 |
| JP | 2008-532190 A | 8/2008 |
| JP | 2009-286230 A | 12/2009 |
| JP | 2013-104690 A | 5/2013 |

\* cited by examiner

FIG. 1

LIST OF ROUTES STORED IN ROUTE MEMORY

| ROUTE | DEPARTING LOCATION | WP01 | WP02 | ... | DESTINATION | TOTAL NAVIGATION DISTANCE |
|---|---|---|---|---|---|---|
| ROUTE 1 | PORT A | (a1,b1) | (a2,b2) | | PORT B | 500NM |
| ROUTE 2 | PORT B | (c1,d1) | (c2,d2) | | PORT A | 500NM |
| ROUTE 3 | PORT C | (e1,f1) | (e2,f2) | | PORT A | 400NM |
| ROUTE 4 | PORT A | (g1,h1) | (g2,h2) | | PORT C | 400NM |
| ROUTE 5 | PORT A | (i1,j1) | (i2,j2) | | PORT D | 600NM |

NAVIGATION DEVICE AND METHOD OF NOTIFYING SERVICE LIFE OF COMPONENT

TECHNICAL FIELD

This disclosure generally relates to a navigation device, which notifies a service life of a ship instrument.

BACKGROUND ART

Generally, electronic devices are comprised of multiple electronic components, such as a power source, a substrate, and an LCD (Liquid Crystal Display), etc. These electronic components have service lives, and may not be able to exert functions as the electronic components after being used for a long period.

Therefore, each electronic component constituting an electronic device is preferably replaced once it reaches a predetermined replacing timing. Patent Document 1 discloses a system for managing service lives of electronic components.

A device service life managing system of Patent Document 1 includes life-limited components (electronic components) and a calculator for managing service lives of the life-limited components. The calculator stores a service life time period of each of the life-limited components based on specifications, etc. Further, the calculator counts an operating time period of the life-limited component, and when the operating time period of the life-limited component exceeds the service life time period, the calculator notifies that the service life of the life-limited component is terminated.

REFERENCE DOCUMENT(S) OF CONVENTIONAL ART

Patent Document
    Patent Document 1: JP1999-110259A

DISCLOSURE OF THE INVENTION

Problems to be Solved by the Invention

Meanwhile, multiple ship instruments are mounted on ships recently. These ship instruments are comprised of multiple electronic components. Further, once a ship sails for navigation, it may not make a port call from a few weeks to a few months long.

Therefore, a situation can be considered, where the electronic components constituting the ship instruments stop functioning due to their termination of service life on the sea and the ship instruments do not operate properly. Particularly, since the ship instruments normally continue to operate without turning the power off, the speed of losing the service life is high, and the service life easily terminates.

Note that, ship instruments particularly important for navigation are redundantly provided, and therefore a critical situation can be avoided; however, a process of transfer from a main instrument to a backup instrument becomes required or a simultaneous use of a plurality of ship instruments becomes unavailable.

Note that, such issues apply, not only to electronic components, but also to mechanical components (e.g., movable components, such as a push key and a rotational key).

This disclosure is made in view of the above situations and mainly aims to provide a component service life notifying device, which notifies a service life of a component so as to prevent the service life of the component from terminating on the sea.

Summary and Effects of the Invention

Problems to be solved by this disclosure are described above, and means for solving the problems and effects thereof will be described below.

According to a first aspect of this disclosure, a navigation device having the following configuration is provided. Specifically, the navigation device includes a route designing module, a navigation time calculating module, a service life acquiring module, a comparing module, and a notifying module. The route designing module designs a route for navigation. The navigation time calculating module calculates a scheduled navigation time period required for navigating the route designed by the route designing module. The service life acquiring module acquires an estimated remaining service life of a component. The comparing module output a comparison result between the scheduled navigation time period to a predetermined destination of the route designed by the route designing module with the estimated remaining service life, and outputs a comparison result thereof. The notifying module notifies a situation that the comparison result outputted from the comparing module indicates that the estimated remaining service life is shorter than the scheduled navigation time period when the situation occurs.

Thus, whether a replacement of the component is required can be notified beforehand in consideration of the scheduled navigation time period (required time period) of the route. Therefore, the termination of the estimated service life of the component on the sea can be prevented.

The navigation device preferably has the following configuration. Specifically, the navigation device includes a display unit configured to display the route designed by the route designing module. A port of call at which a ship makes a stop is settable as a waypoint on the route by the route designing module. The notifying module controls a display mode of the waypoint to be different between a case where the ship makes a stop at the port of call before the estimated service life terminates and a case where the ship makes a stop at the port of call after the estimated service life terminates.

Thus, the port of call at which the component needs to be replaced before reaching can visually be grasped.

The navigation device preferably has the following configuration. Specifically, the navigation device includes a display unit configured to display the route designed by the route designing module. The notifying module controls a display mode of the route displayed on the display unit to be different between part of the route passing before the estimated service life terminates and part of the route passing after the estimated service life terminates.

Thus, a location on the route at which the component needs to be replaced before reaching can visually be grasped.

With the navigation device, the estimated remaining service life of the component acquired by the service life acquiring module is preferably calculated based on a temperature around the component.

Thus, the estimated remaining service life of the component can be calculated more accurately. Therefore, the situation that the replacement of the component is required can be notified at a more suitable timing.

The navigation device preferably includes a transmitter configured to externally transmit component data including at least one of the estimated remaining service life and the comparison result.

Thus, the information regarding the service life of the component, etc., can be grasped externally.

With the navigation device, the transmitter preferably transmits the component data to a predetermined onshore location (e.g., land station).

Thus, the information on the sea can be acquired on land. Therefore, for example, the component that requires a replacement anytime soon can be grasped.

The navigation device preferably has the following configuration. Specifically, the notifying module, when notifying that the estimated service life of the component terminates during the navigation, inquires whether to replace the component. The transmitter, upon receiving an instruction to replace the component, externally transmits the component data.

Thus, the user can make an arrangement for the replacement of the component by simply taking a procedure according to the notification of the notifying module. Further, a person who replaces the component can easily acquire information, such as a model number of the component. Therefore, the component that requires the replacement can surely be identified.

With the navigation device, the notifying module, when notifying that the estimated service life of the component terminates during the navigation, preferably notifies a service station located in the vicinity of the designed route and where the component is replaceable.

Thus, the user can grasp the station where the component can be replaced by making a stop thereat, without personally contacting the service station.

With the navigation device, the notifying module, when notifying that the estimated service life of the component terminates during the navigation, preferably notifies at least one of a cost and time required for the replacement of the component, for every station where the component is replaceable.

Thus, a material for determining the location (port) at which the component is to be replaced can be provided to the user.

The navigation device preferably has the following configuration. Specifically, a ship instrument is connected with the navigation device via a network. The service life acquiring module acquires an estimated remaining service life of a component of the ship instrument within the network. The notifying module notifies a situation that the estimated remaining service life of the component of the ship instrument is shorter than the scheduled navigation time period when the situation occurs.

Thus, the service life of instruments other than the navigation device can also be notified to the user. Further, the information regarding the service life can uniformly be managed.

The navigation device preferably has the following configuration. Specifically, the navigation device includes a service life memory storing, beforehand, a service life of a component of a ship instrument mounted on the same ship as the navigation device. The service life acquiring module acquires an estimated remaining service life of the component of the ship instrument based on the service life of the component of the ship instrument stored in the service life memory. The notifying module notifies a situation that the estimated remaining service life of the component of the ship instrument is shorter than the scheduled navigation time period when the situation occurs.

Thus, the service life can be notified also regarding ship instruments that are not connected with the navigation device.

According to a second aspect of this disclosure, the following method of notifying a service life of a component is provided. Specifically, the method of notifying the service life of the component includes designing a route for navigation, calculating a scheduled navigation time period required for navigating the route designed by the designing the route, acquiring an estimated remaining service life of the component, comparing the scheduled navigation time period to a predetermined destination of the route designed by the designing the route with the estimated remaining service life, and outputting a comparison result thereof, and notifying a situation that the comparison result outputted in the outputting the comparison result indicates that the estimated remaining service life is shorter than the scheduled navigation time period when the situation occurs.

Thus, whether a replacement of the component is required can be notified beforehand in consideration of the scheduled navigation time period (required time period) of the route. Therefore, the termination of the estimated service life of the component on the sea can be prevented.

MODE(S) FOR CARRYING OUT THE INVENTION

Figure 1:
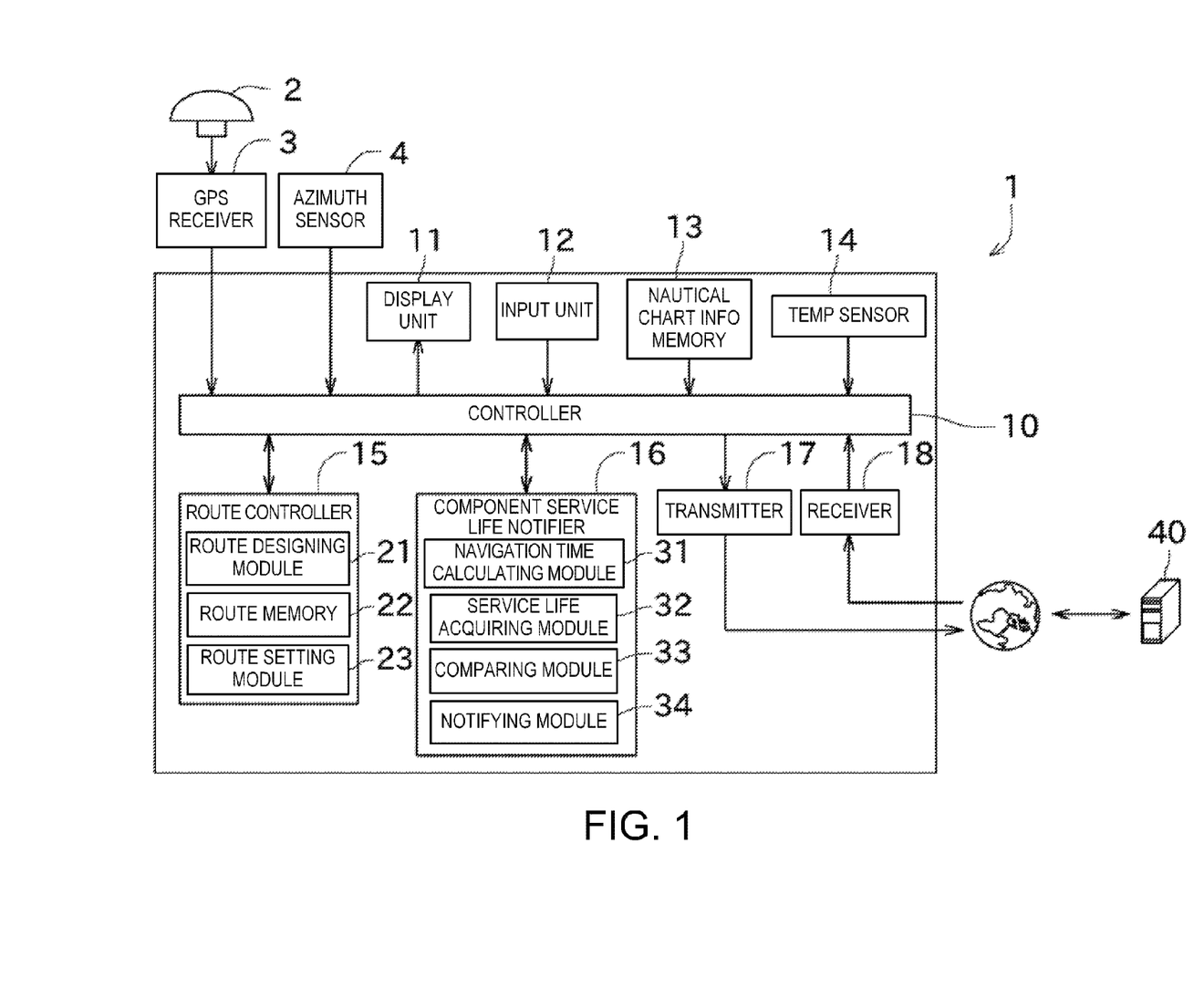
FIG. 1 is a block diagram illustrating a configuration of a navigation device according to one embodiment of this disclosure.

Next, one embodiment of this disclosure is described with reference to the drawings. FIG. 1 is a block diagram illustrating a configuration of a navigation device according to one embodiment of this disclosure.

The navigation device 1 is mounted on a ship and displayable of a position of the ship and a set route on a nautical chart. The navigation device 1 can instruct an autopilot device (not illustrated) to perform navigation along the route. Thus, the ship can perform the navigation along a route designed by a user.

The navigation device 1 is connected with a GPS receiver 3 and an azimuth sensor 4.

The GPS receiver 3 receives positioning signals from a GPS antenna 2 and performs positioning to detect positional information of the ship. The positional information calculated by the GPS receiver 3 is outputted to a controller 10 of the navigation device 1.

The azimuth sensor 4 includes a plurality of GPS antennas fixed to the ship, and can detect a heading (an orientation of the ship) based on a relative positional relationship of the GPS antennas. The heading calculated by the azimuth sensor 4 is outputted to the controller 10 of the navigation device 1. Note that, as the azimuth sensor 4, other than the configuration including the plurality of GPS antennas, a magnetic azimuth sensor or a gyrocompass may be used, for example.

As illustrated in FIG. 1, the navigation device 1 includes the controller 10, a display unit 11, an input unit 12, a nautical chart information memory 13, a temperature sensor 14, a route controller 15, a component service life notifier 16, a transmitter 17, and a receiver 18.

The controller 10 includes hardware comprised of a CPU, a RAM, a ROM, etc., which are not illustrated, and software comprised of various kinds of programs stored in the ROM. The controller 10 can perform controls (e.g., display control) of the navigation device 1 by executing the programs. Note that, the programs, other than the configuration of being stored in the ROM provided to the controller 10, may be stored in a memory medium (e.g., optical disc, memory card).

The display unit 11 can display various images created by the navigation device 1. For example, the display unit 11 can display an image with the position of the ship and the route on the nautical chart.

The input unit 12 is, for example, a key controlled by the user. The user can design the route and change display settings by inputting an instruction through controlling the input unit 12. Note that, the input unit 12, without limiting to physical key(s), such as arrow keys or a rotational key, may be a touch panel. Further, the input unit 12 may be a mouse, a trackball, etc., configured to move a pointer on a display screen.

The nautical chart information memory 13 is, for example, a hard disk drive, and stores an electronic nautical chart. Note that, instead of the hard disk drive, the nautical chart information memory 13 may include a memory medium (e.g., optical disc, memory card) and a device configured to read information from the memory medium.

The temperature sensor 14 acquires a temperature inside the navigation device 1 (specifically, a temperature around an electronic component). The temperature acquired by the temperature sensor 14 is used for acquiring an estimated remaining service life (a time period until the estimated service life terminates) as described later. Therefore, the temperature acquired by the temperature sensor 14 is outputted to the component service life notifier 16 via the controller 10.

The route controller 15 includes a route designing module 21, a route memory 22, and a route setting module 23.

The route designing module 21 can design the route according to an instruction from the user. Specifically, the user selects a route designing mode by performing a predetermined input operation on the input unit 12. Then, the user sequentially specifies arbitrary locations on the nautical chart, and finally specifies a destination to define the route. The location finally specified by the user becomes the destination and the other locations become waypoints (stopover locations, specifically, veering point or port of call). Note that, in the route, in addition to the waypoints and destination, a required time period to reach one of the waypoints and the destination may also be set.

Figure 2:
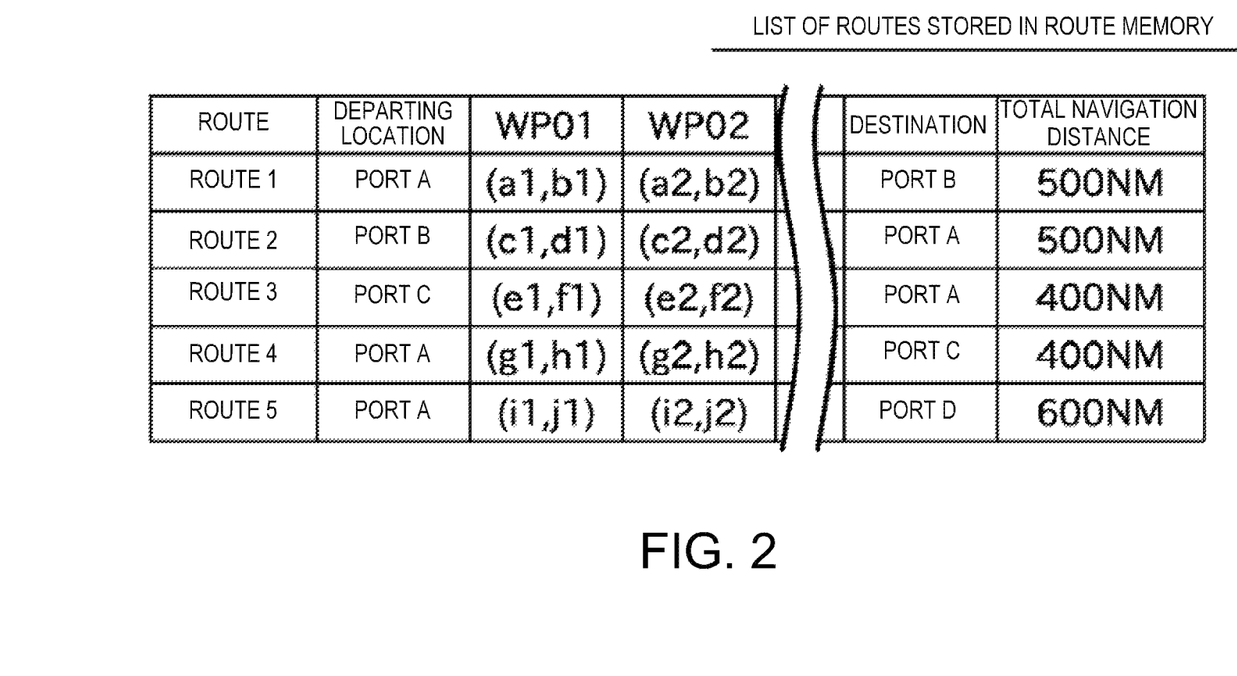
FIG. 2 is a view illustrating a list of routes stored by a route memory.

The route memory 22 stores the route designed by the route designing module 21. For example, as illustrated in FIG. 2, the route memory 22 stores names (specifically, also positional information) of a departing location and the destination, positional information of WPs (waypoints), and a total navigation distance of the route. Note that, the information illustrated in FIG. 2 is an example, and may have additional information or omission of the information. For example, the total navigation distance may suitably be obtained as needed without being stored in the route memory 22.

The route setting module 23 may set the route specified by the user into the navigation device 1. Here, "set the route (into the navigation device 1)" means performing settings to, for example, display the route on the display unit, so as to perform the navigation along the route. Note that, the route setting module 23 is settable of one of a route newly designed by the route designing module 21 and the route designed beforehand and stored in the route memory 22.

The component service life notifier 16 includes a navigation time calculating module 31, a service life acquiring module 32, a comparing module 33, and a notifying module 34.

The navigation time calculating module 31 calculates a scheduled navigation time period required for navigating the route. When a required time period to reach the destination is set, the navigation time calculating module 31 uses the required time period as the scheduled navigation time period. Note that, when the required time period includes a time period of anchorage, a time period obtained by subtracting the time period of anchorage from the required time period may be the schedule navigation time period. Moreover, when the required time period to reach the destination is not set, the navigation time calculating module 31 estimates the scheduled navigation time period based on a required time period of a previous navigation of the same route, a current/previous speed of the ship, etc.

Figure 3:
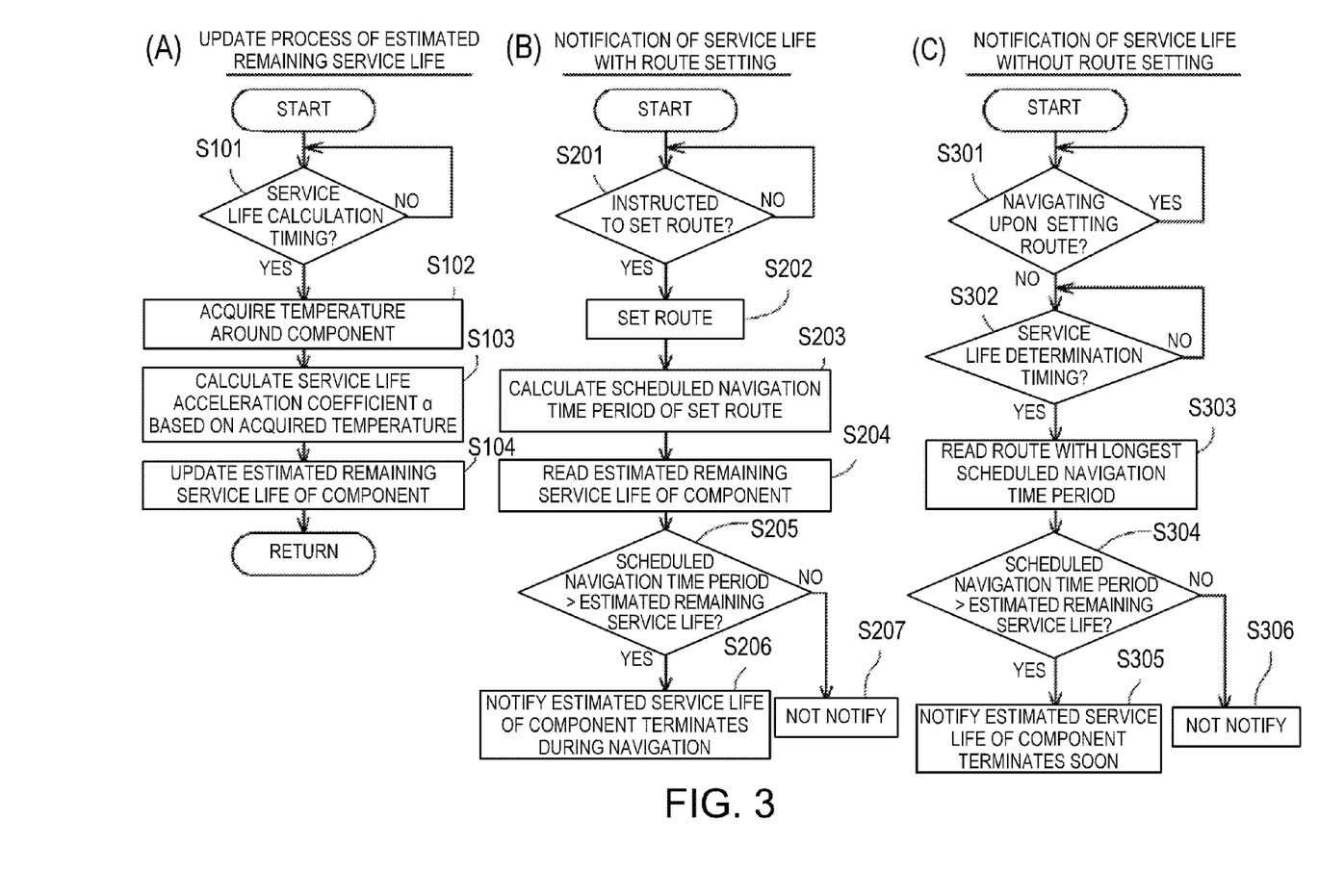
FIG. 3 shows flowcharts illustrating notification processing before an estimated service life terminates.

The service life acquiring module 32 acquires a remaining service life obtained by estimation (estimated remaining service life) for each of the components constituting the navigation device 1 (service life acquiring process). Although the method of acquiring the estimated remaining service life by the service life acquiring module 32 is arbitrary, in this embodiment, the processing is performed along the flowchart of FIG. 3(A).

The service life acquiring module 32 acquires, from the controller 10, whether each component is in operation, and updates an operating time period for the component in operation by a timer or an RTC, etc., as needed. Further, the service life acquiring module 32, upon detecting an arrival of a predetermined service life calculation timing (S101), acquires the temperature detected by the temperature sensor 14 from the controller 10 (S102).

Next, the service life acquiring module 32 calculates a service life acceleration coefficient α based on the acquired temperature (S103). The service life acceleration coefficient α indicates ease of consumption of the service life compared to when the detected temperature is an optimal temperature (a temperature at which the service life is least consumed, e.g., 25° C.). Specifically, the service life is consumed α-times more compared to when the detected temperature is the optimal temperature. The service life acceleration coefficient α can be obtained by the equation in the next paragraph, for example.

$$\alpha = \text{total service life time period}/(\text{total service life time period} - \text{temperature coefficient} \times \text{variation from optimal temperature})$$

Here, the total service life time period is a time period for which the component can exert its function, and is a fixed value described in a specification thereof, etc., for every component. The optimal temperature is a temperature at which the longest service life of the component is obtained (e.g., 25° C.). The temperature coefficient is a coefficient defining a grade of influence on the service life when varying from the optimal temperature. The service life acquiring module 32 obtains the service life acceleration coefficient α as described above.

Next, the service life acquiring module 32 acquires the estimated remaining service life for each component by using the service life acceleration coefficient α. The service life acquiring module 32 performs the above processing every time the service life calculation timing arrives.

Note that, although the estimated remaining service life can be calculated more accurately as the service life calculation timing at S101 is shortened, the operation load increases. Therefore, to reduce the operation load while applying a temperature difference between day and night to the calculation of the service life, the service life calculation timing is preferably between one hour and about a few hours. Note that, in an environment where the temperature difference does not easily occur, the service life calculation timing may be extended even longer.

The comparing module 33 compares the scheduled navigation time period calculated by the navigation time calculating module 31 with the estimated remaining service life, and outputs the comparison result. Specifically, the comparing module 33 obtains a difference between the scheduled navigation time period and the estimated remaining service life and outputs it, or the comparing module 33 simply outputs which one is longer (shorter) between the scheduled navigation time period and the estimated remaining service life.

When the comparison result indicates a situation that "the estimated remaining service life is shorter than the scheduled navigation time period," the notifying module 34 notifies the situation thereof (in other words, the situation that the estimated service life terminates within the navigation time period). Note that, the details of the notifying method are described later.

The transmitter 17 and the receiver 18 can communicate with a server 40 of a dealer of ship instruments, for example, by using one of a satellite communication line and a mobile phone line. Specifically, when a predetermined condition is satisfied, the transmitter 17 notifies a component in need of replacement, to the server 40 (described later in detail). Moreover, the receiver 18 acquires whether an update of one of software and database of the ship instrument exists, from the server 40 (described later in detail).

Next, processing of notifying the estimated service life of the component when the route is set is described with reference to FIG. 3(B).

The user instructs the input unit 12 to set a desired route, by performing a predetermined input operation thereon. The route setting module 23, upon accepting the instruction (S201), sets the corresponding route (S202, route setting process).

Next, the navigation time calculating module 31 performs the processing described above to calculate the scheduled navigation time period of the set route (S203, navigation time period calculating process). The scheduled navigation time period is outputted to the notifying module 34. Moreover, the notifying module 34 reads the estimated remaining service life of each component, which is continuously updated by the service life acquiring module 32 (S204).

Then, the comparing module 33 determines whether the estimated remaining service life is shorter than the scheduled navigation time period (S205). Note that, when there is time to spare until the navigation along the set route starts, the determination may be performed by taking this time into consideration. Further, the scheduled navigation time period is an approximate value, and therefore, the determination may be performed using a value obtained by adding a predetermined time period to the scheduled navigation time period so as to increase reliability of the value.

When the comparing module 33 determines that the estimated remaining service life is shorter than the scheduled navigation time period, the notifying module 34 notifies the situation that the estimated service life of the component terminates during the navigation (S206, notifying process). As the notifying method, a method of displaying the situation on the display unit 11, notifying it with a sound by using, for example, a speaker, or notifying it with light by using, for example, a lamp, can be considered. By performing such notification, the user can grasp beforehand whether the replacement of the component is required.

On the other hand, when the estimated remaining service life is determined to be longer than the scheduled navigation time period, the notifying module 34 does not particularly perform the notification (S207). Note that, the notifying module 34 may notify "a situation that the estimated service life of the component does not terminate during the navigation."

Figure 4:
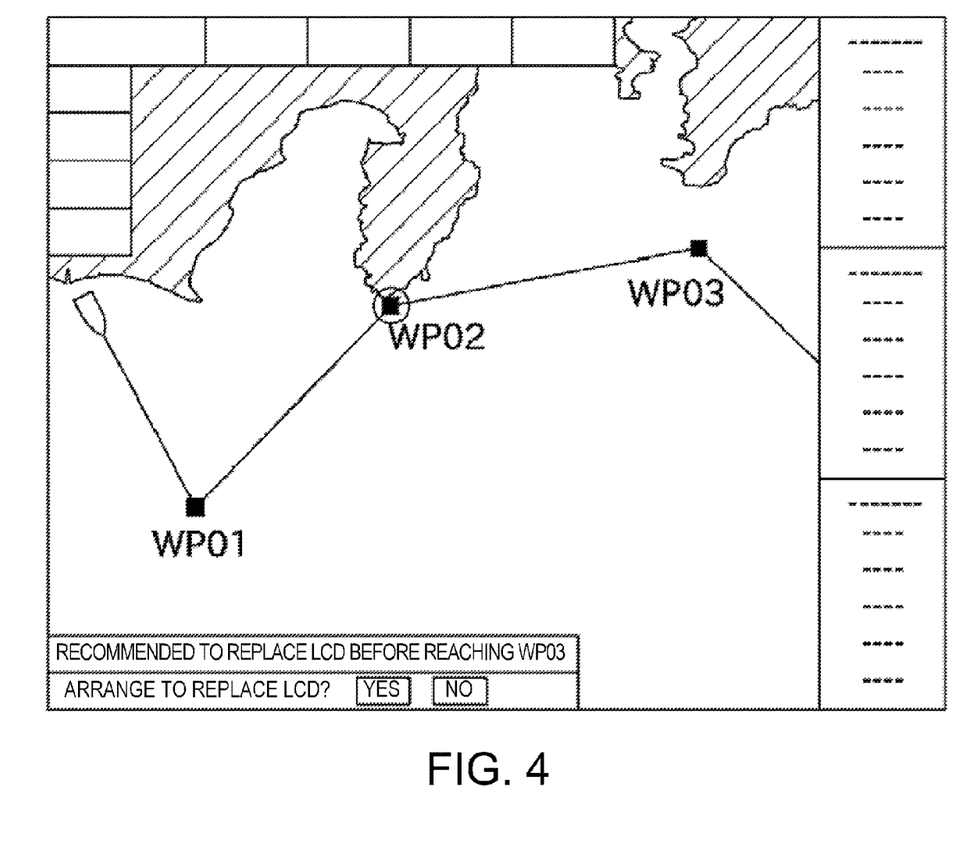
FIG. 4 is a view illustrating a screen where a display mode of a waypoint is controlled to be different between before and after the estimated service life of a component terminates.
Figure 5:
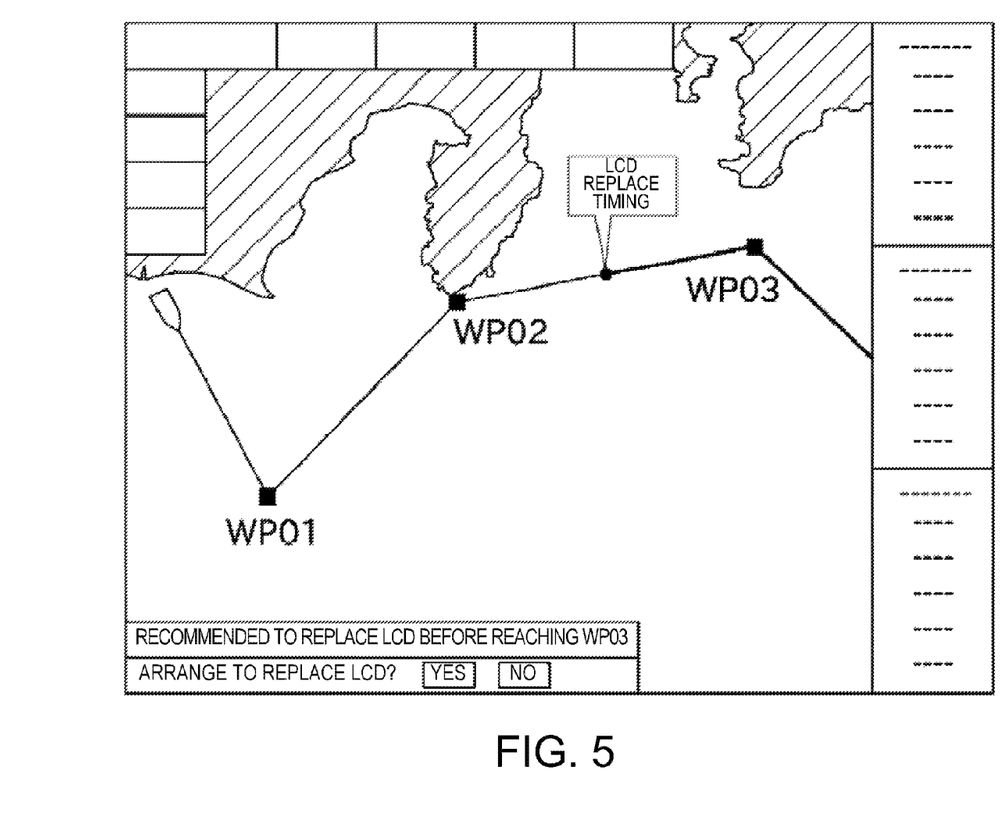
FIG. 5 is a view illustrating the screen where a display mode of a route is controlled to be different between before and after the estimated service life of the component terminates.
Figure 6:
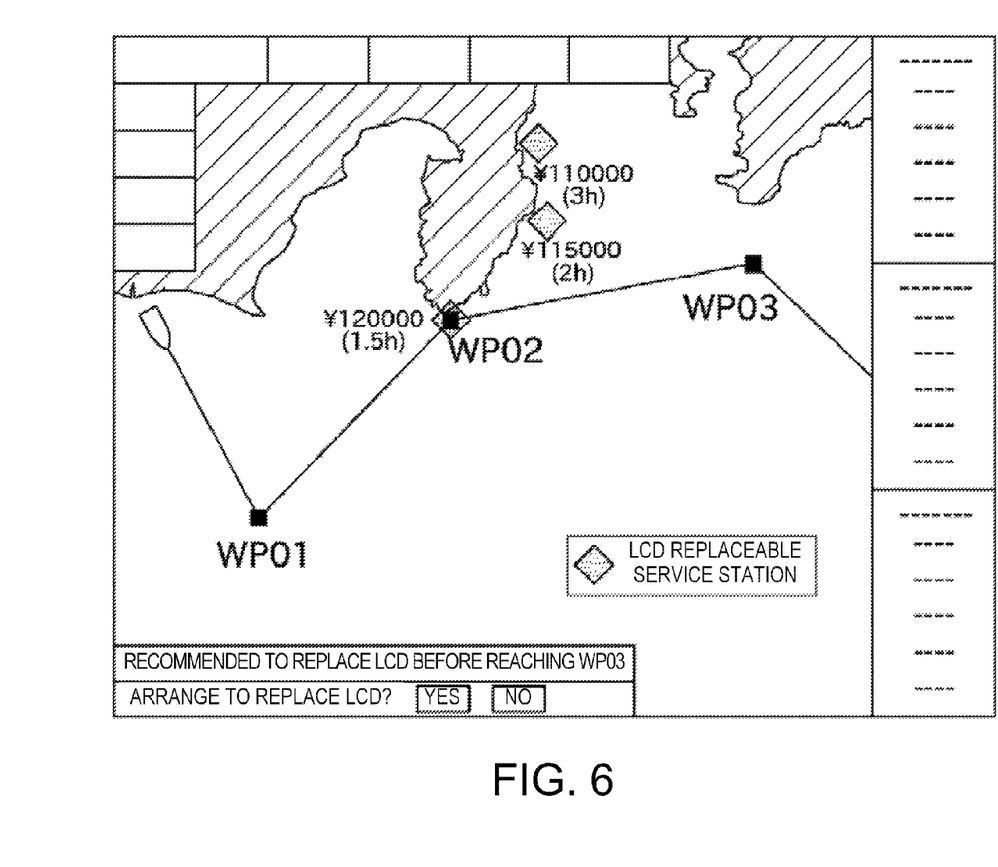
FIG. 6 is a view illustrating the screen where locations at which the component is replaceable are displayed.

Next, the displaying method of the notification at S206 (the notification of the situation that the estimated service life of the component terminates during the navigation) is described with reference to FIGS. 4 to 6. FIGS. 4 to 6 are views illustrating the display screen when the estimated service life of the component is notified.

First, screens displayed in FIGS. 4 to 6 are briefly described. In the screens, land is indicated by hatching lines and the sea is indicated by a solid color. The mark shaped into a ship indicates the ship. Square figures daubed with a color indicate locations of the waypoints (stopover locations) and WP01, etc., denoted thereunder indicate numbers of the stopover locations. Note that as described above, each waypoint indicates a veering point on the sea or the port of call, etc.

Here, a case is considered, where the notifying module 34 compares the scheduled navigation time period with the estimated service life and, as a result, it is obtained that the estimated service life of an LCD terminates between WP02 and WP03.

In FIG. 4, the name of the component of which estimated service life terminates during the navigation and the waypoint which the estimated service life of the component terminates before reaching is displayed with a text at the bottom left of the screen. Note that, in this text, a specific estimated remaining service life may be displayed.

Moreover, in FIG. 4, the waypoint which the estimated service life of the component terminates before reaching and that is a port of call, is marked with a circle. Therefore, in FIG. 4, WP02 that is immediately prior to WP03 and is a port of call is marked with a circle. Since WP01 is a veering point on the sea, it is not marked with a circle. Note that, the method of displaying, in a different display mode from others, the port of call which the estimated service life of the component terminates before reaching is arbitrary, and examples of which include whether to have a mark, whether to blink, differing in color, and adding a comment.

In FIG. 5, in addition to the notification with a text similar to FIG. 4, a location at which the estimated service life of the component terminates is specifically displayed. Further, in FIG. 5, part of the route corresponding to after the estimated service life of the component terminates is displayed by a thicker line than the line of part of the route corresponding to before the estimated service life of the component terminates. Note that, the method of controlling the display mode of the route to be different between before and after the estimated service life of the component terminates is arbitrary, and examples of which include whether to blink one of the lines, differing in color of the lines, differing in kind of the lines (e.g., solid line, dashed line, and chain line).

In FIG. 6, in addition to the notification with a text similar to the above description, a location at which the component of which the estimated service life terminates is replaceable (port of call), and a cost and time required for the replacement are displayed. In FIG. 6, the component is not replaceable at WP01 since it is the veering point on the sea, and therefore, the display mode of WP01 is not particularly changed. On the other hand, WP02 is a port and has a service station nearby, and therefore, it is displayed as the location at which the component is replaceable. Note that, in FIG. 6, other than the port set as the waypoint, locations in the vicinity of the route and at which the component concerned is replaceable are also displayed. Note that, the method of displaying the locations at which the component is replaceable may be displaying by various methods similar to above.

Moreover, to perform the display of FIG. 6, the navigation device 1 needs to store beforehand or acquire in real time or periodically from the server 40, etc., information regarding acquisition of the component. The information regarding the acquisition of the component includes an inventory of the component at every service station, a distance from the service station to the port, a cost of the component, a traveling expense for a worker to attach the component, and time required for the attaching of the component. Further, in FIG. 6, "time required for the attaching of the component" is displayed as a total of a time period required for a round trip to the service station concerned and a time period required for the attaching of the component; however, this display is an example and suitably changeable.

The user can determine the port of call where the component is to be replaced, in view of position, a cost and time by looking at the display of FIG. 6.

Further, in FIGS. 4 to 6, a text for selecting whether to make an arrangement for the replacement of the component is displayed at the bottom left of the screen. In a case where the user selects "YES" to instruct the arrangement of the replacement of the component, the navigation device 1 transmits, by the transmitter 17, component data regarding the arrangement of the replacement of the component (e.g., the model number of the component, the position of the ship and the stopover location, the estimated remaining service life of the component, the comparison result obtained by the comparing module 33, and an ID for specifying one of the ship and the user) to the server 40 disposed on land. Note that, when the communication line cannot be used, the situation thereof is notified to the user, and at a timing at which the communication line becomes useable, the component data described above is transmitted to the server 40.

The server 40 makes the arrangement of the component based on the component data received from the transmitter 17. Note that, the transmitter 17 may transmit the component data described above to the service station (land station) on land where the component replacement is performed, instead of the server 40 which makes the arrangement of the component.

Since the displays of FIGS. 4 to 6 are performed based on the estimated scheduled navigation time period, actually, the estimated service life of the component can be considered to terminate around the specified location. Therefore, the navigation device 1 obtains the scheduled navigation time period based on the current location, speed, etc., of the ship at every predetermined time period, and updates the displays of FIGS. 4 to 6. Thus, more reliable information can be notified to the user.

The method of displaying the situation that the estimated service life of the component terminates may be applied to displaying whether the update of one of the software and database exists. Currently, a metered-rate is adopted in many cases for satellite communication which is available on the sea, and it is not practical to update the one of the software and database through the satellite communication line. Therefore, such an update is performed by using a record medium. Note that, whether the update exists can be received by the receiver 18, for example, via one of the satellite communication line and the mobile phone line.

Figure 7:
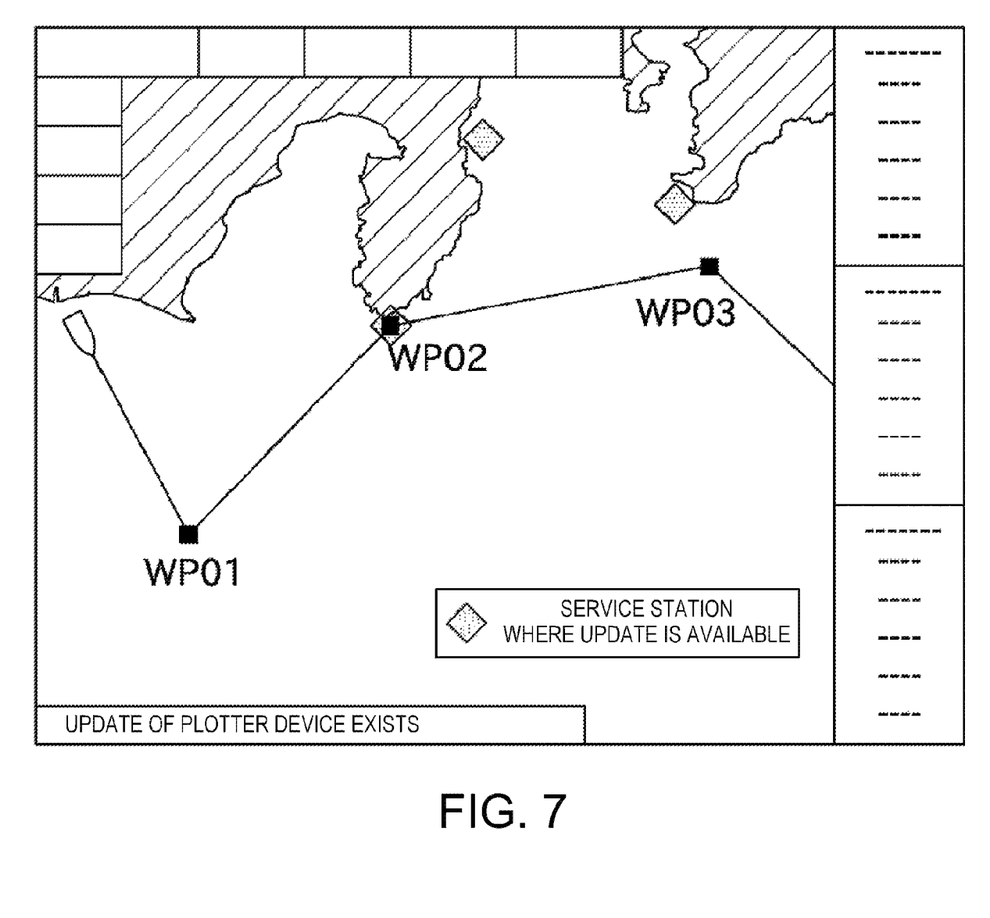
FIG. 7 is a view illustrating the screen where locations at which an update of data is available are displayed.

In FIG. 7, the existence of the update is notified with a text at the bottom left of the screen, and a location at which a record medium storing the update file can be supplied is displayed on the nautical chart.

Next, processing of notifying the estimated service life of the component when the navigation is performed without setting the route is described with reference to FIGS. 3(C) and 8.

When the navigation is performed (or the navigation is started) without setting the route, on the navigation device 1 side, the timing at which the navigation ends cannot be grasped. Therefore, processing different from when the navigation is performed upon setting the route is required.

Specifically, the navigation device 1, upon determining that the navigation is performed without setting the route (S301), performs processing as follows at every predetermined service life determination timing. The service life determination timing may be the same as or different from the service life calculation timing in FIG. 3(A).

Upon the arrival of the service life determination timing (S302), the navigation device 1 accesses the route memory 22 and reads a route with one of the longest scheduled navigation time period and the longest navigation distance (S303). Next, the notifying module 34 of the navigation device 1, similar to S205, determines whether the estimated remaining service life is shorter than the scheduled navigation time period based on the read scheduled navigation time period and the estimated remaining service life of each component (S304).

Then, when the estimated remaining service life is determined to be shorter than the scheduled navigation time period, the notifying module 34 notifies the situation that the estimated service life of the component is short (S305). On the other hand, the notifying module 34 does not notify (or notifies the situation that the estimated service life has allowance) when the estimated remaining service life is determined to be longer than the scheduled navigation time period before the scheduled navigation time period elapses.

Here, the longest scheduled navigation time period among the stored routes is used so as to surely prevent the termination of the estimated service life of the component on the sea. The navigation device 1 performs the processing described above at every service life determination timing. Note that, from the second time the processing is performed, the processing of accessing the route memory 22 may be omitted and the scheduled navigation time period used in the first time may be reused.

Next, one example of the notifying method when the route is not set is described. FIG. 8 is a view illustrating a screen displaying ports at which the component is replaceable when the navigation is performed without setting the route.

Figure 8:
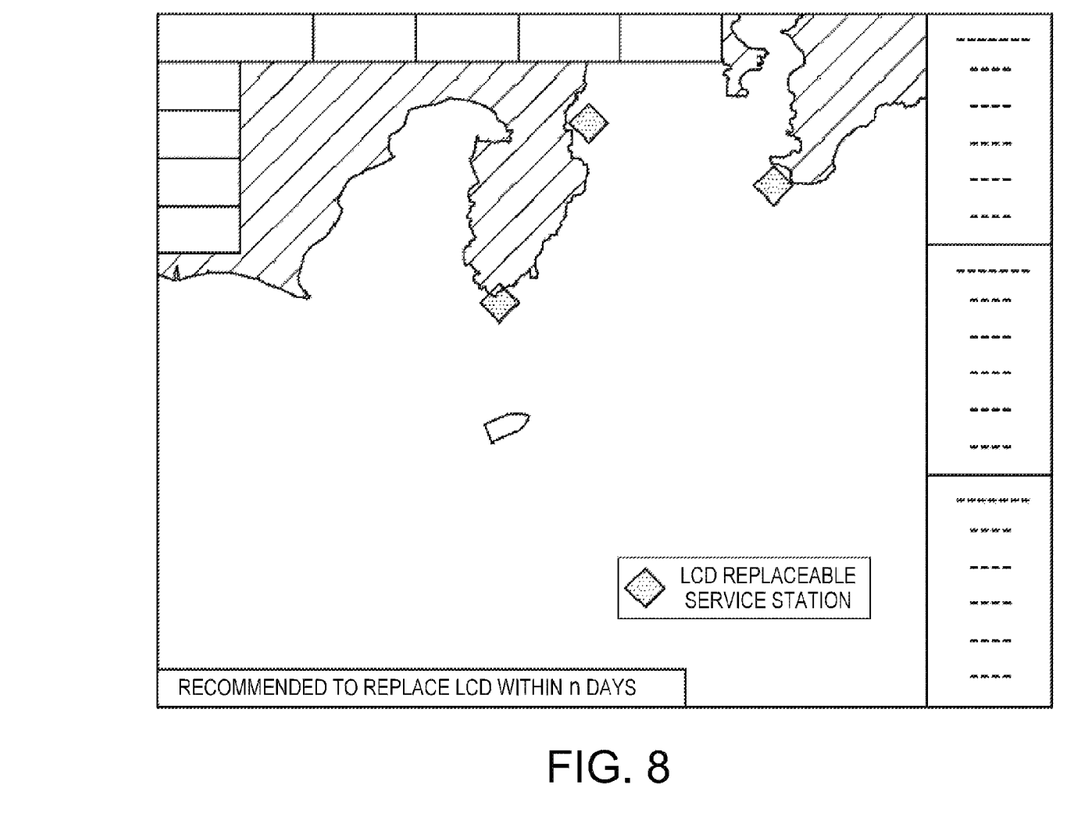
FIG. 8 is a view illustrating the screen where the locations at which the component is replaceable are displayed during navigation without setting a route.

In this case, as illustrated in FIG. 8, locations in the vicinity of the ship and at which the component concerned is replaceable are displayed. Further, a specific estimated service life is displayed at the bottom left of the screen.

As described above, the navigation device 1 of this embodiment includes the route setting module 23, the navigation time calculating module 31, the service life acquiring module 32, the comparing module 33, and the notifying module 34. The route setting module 23 sets the route for navigation. The navigation time calculating module 31 calculates the scheduled navigation time period of the route set by the route setting module 23. The service life acquiring module 32 calculates the estimated remaining service life of the component. The comparing module 33 compares the estimated remaining service life with the scheduled navigation time period until reaching the predetermined destination on the route set by the route setting module 23, and outputs the comparison result. When the comparison result outputted by the comparing module 33 indicates that the estimated remaining service life is shorter than the scheduled navigation time period, the notifying module 34 notifies the situation thereof.

Thus, whether the replacement of the component is required can be notified beforehand in consideration of the scheduled navigation time period (required time period). Therefore, the termination of the estimated service life of the component on the sea can be prevented.

Although the preferred embodiment of this disclosure is described above, the above configuration may be modified as follows.

The method of acquiring the estimated remaining service life is arbitrary, and for example, a factor other than the temperature around the component may be used. Further, the method of acquiring the estimated remaining service life may be changed according to the component.

In the above description, the method of acquiring the estimated remaining service life of the electronic component is described; however, this disclosure is also applicable to mechanical components (e.g., movable components, such as a push key and a rotational key). In this case, the estimated remaining service life is acquired based on an operating time period or the number of times the key is operated, etc. Moreover, the service life acquiring module 32 may have a configuration of acquiring an estimated remaining service life obtained by one of an external instrument and another internal component.

The processing indicated by the flowchart of FIG. 3 is an example, and processing may be added, changed, and deleted.

In the above description, the configuration of detecting the position of the ship based on the signals from the GPS satellites is adopted; however, a configuration of detecting the position of the ship by using other GNSS (Global Navigation Satellite System) satellites may be adopted. Examples of the other GNSS satellites include GLONASS satellites and GALILEO satellites.

The notifying destination (transmission destination) of one of the notifying module 34 and the transmitter 17 may suitably be changed, and for example, the display unit 11, other display unit, other ship instruments, etc., may be notified (transmitted).

In the above description, only when the user gives the instruction for replacement, the component data is transmitted to land, etc.; however, when the instruction of the user is not given, data of the estimated remaining service life or a difference between the estimated remaining time period and the scheduled navigation time period, etc., may be transmitted at a predetermined timing.

In the above description, the navigation device 1 may be a general-purpose navigation device with which various ship instruments (radar antenna and fish finder) are connected. In this case, a configuration of notifying, not only an estimated service life of a component of the navigation device, but also estimated service lives of components of the ship instruments to be connected may be adopted.

Figure 9:
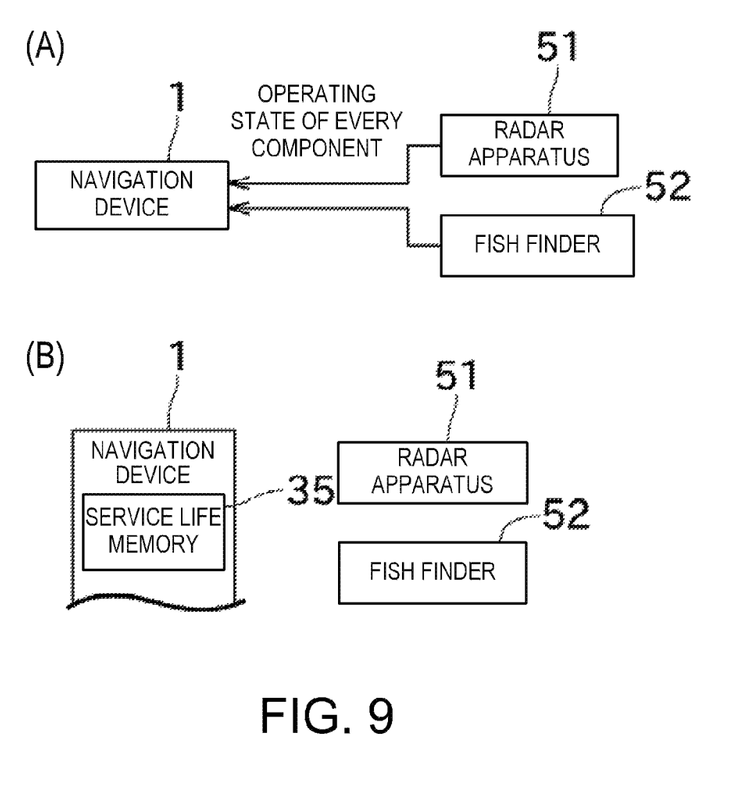
FIG. 9 shows block diagrams illustrating configurations of notifying a service life other than the navigation device.

For example, in a case where the navigation device 1 is connected with a radar apparatus 51 and a fish finder 52 via a network and they are mutually communicable as illustrated in FIG. 9(A), the navigation device 1 acquires, for example, an estimated remaining service life of every component from the radar apparatus 51 and the fish finder 52. The navigation device 1 compares the estimated remaining service life with the scheduled navigation time period and, in the case where the estimated service life terminates during navigation, the navigation device 1 notifies the situation thereof, etc.

Moreover, for example when the navigation device 1 and the radar apparatus 51, etc., which are disposed on the same ship, are not connected with each other as illustrated in FIG. 9(B), the navigation device 1 acquires beforehand the service lives of the radar apparatus 51, etc., based on the specification, etc., and stores them in a service life memory 35. Then, the navigation device 1 can acquire the estimated remaining service life by subtracting the operating time period of the navigation device 1 from the service life stored in the service life memory 35. The navigation device 1 compares the estimated remaining service life with the scheduled navigation time period and, in the case where the estimated service life terminates during the navigation, the navigation device 1 notifies the situation thereof, etc.

DESCRIPTION OF REFERENCE NUMERAL(S)

1 Navigation Device
10 Controller
11 Display Unit
12 Input Unit
13 Nautical Chart Information Memory
14 Temperature Sensor
15 Route Controller
16 Component Service Life Notifier
17 Transmitter
18 Receiver
21 Route Designing Module
22 Route Memory
23 Route Setting Module
31 Navigation Time Calculating Module
32 Service Life Acquiring Module
33 Comparing Module
34 Notifying Module

The invention claimed is:

1. A navigation device comprising:
one or more hardware processors that execute specific computer-executable instructions to at least:
design a route for navigation of a vehicle between an origin location and a destination location;
calculate a scheduled navigation time period for navigating the route by the vehicle;
estimate a remaining service life of a component of the vehicle;
compare the scheduled navigation time period to the estimated remaining service life of the component to obtain a comparison result; and
output an alert when the comparison result indicates that the estimated remaining service life of the component is shorter than the scheduled navigation time period.

2. The navigation device of claim 1, further comprising a display unit that displays the route, wherein the one or more hardware processors further execute specific computer-executable instructions to at least:
set as a waypoint an intermediary destination between the origin location and the destination location along the route;
select a first display mode to display the waypoint on the display unit when the vehicle stops at the waypoint before the estimated remaining service life is satisfied; and
select a second display mode to display the waypoint on the display unit when the vehicle stops at the waypoint after the estimated service life is satisfied.

3. The navigation device of claim 1, further comprising a display unit that displays the route, wherein the one or more hardware processors further execute specific computer-executable instructions to at least:
select a first display mode to display the route on the display unit when the vehicle reaches the destination location of the route before the estimated remaining service life is satisfied; and
select a second display mode to display the route on the display unit when the vehicle reaches the destination location of the route after the estimated remaining service life is satisfied.

4. The navigation device of claim 1, wherein the estimated remaining service life of the component is calculated based on an ambient temperature around the component detected by a temperature sensor.

5. The navigation device of claim 1, further comprising a transmitter that transmits component data including at least one of the estimated remaining service life and the comparison result.

6. The navigation device of claim 5, wherein the transmitter transmits the component data to a particular onshore location.

7. The navigation device of claim 5, wherein the transmitter transmits the component data to a land station.

8. The navigation device of claim 5, wherein the one or more hardware processors further execute specific computer-executable instructions to at least:
determine whether to replace the component when the estimated remaining service life is satisfied; and
in response to determining that the components is to be replaced, transmitting the component data.

9. The navigation device of claim 1, wherein the one or more hardware processors further execute specific computer-executable instructions to at least notify a service station located a threshold distance of the route when the estimated remaining service life is satisfied during navigation of the route and the component is replaceable.

10. The navigation device of claim 9, wherein the one or more hardware processors further execute specific computer-executable instructions to at least output for display on a display unit at least one of a cost and a service time for replacement of the component for one or more service stations when the component is replaceable.

11. The navigation device of claim 1, wherein a vehicle instrument is in communication with the navigation device via a network, and wherein the component is part of the vehicle instrument.

12. The navigation device of claim 1, further comprising a non-volatile memory that stores a service life of the component, the component part of a vehicle instrument mounted on the same vehicle as the navigation device, wherein the one or more hardware processors estimates the remaining service life of the component based at least in part on the service life of the component accessed from the non-volatile memory.

13. The navigation device of claim 1, wherein the vehicle is a ship.

14. A computer-implemented method comprising:
as implemented by one or more computing devices configured with specific computer-executable instructions,
determining a route for navigation of a vehicle between a first location and a second location;
calculating a scheduled navigation time period for navigating the route by the vehicle;
determining an estimated remaining service life of a component of the vehicle;
comparing the scheduled navigation time period to the estimated remaining service life of the component to obtain a comparison result; and
outputting an alert when the comparison result indicates that the estimated remaining service life of the component does not satisfy the scheduled navigation time period.

* * * * *